(12) United States Patent
Kimura et al.

(10) Patent No.: US 11,125,335 B2
(45) Date of Patent: Sep. 21, 2021

(54) SLIDING COMPONENT (71) Applicant: EAGLE INDUSTRY CO., LTD., Tokyo (JP)

(72) Inventors: Wataru Kimura, Tokyo (JP); Yuichiro Tokunaga, Tokyo (JP); Yuta Negishi, Tokyo (JP); Takeshi Hosoe, Tokyo (JP); Hideyuki Inoue, Tokyo (JP); Tetsuya Iguchi, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 65 days.

(21) Appl. No.: 16/475,641

(22) PCT Filed: Jan. 15, 2018

(86) PCT No.: PCT/JP2018/000787
§ 371 (c)(1),
(2) Date: Jul. 2, 2019

(87) PCT Pub. No.: WO2018/139232
PCT Pub. Date: Aug. 2, 2018

(65) Prior Publication Data
US 2021/0054935 A1 Feb. 25, 2021

(30) Foreign Application Priority Data
Jan. 30, 2017 (JP) .............................. JP2017-014827

(51) Int. Cl.
*F16J 15/34* (2006.01)
*F16C 33/10* (2006.01)
*F16C 33/74* (2006.01)

(52) U.S. Cl.
CPC ......... *F16J 15/3412* (2013.01); *F16C 33/107* (2013.01); *F16C 33/1065* (2013.01); *F16C 33/74* (2013.01); *F16C 2360/24* (2013.01)

(58) Field of Classification Search
CPC ...... F16J 15/34; F16J 15/3404; F16J 15/3408; F16J 15/3412; F16J 15/3424;
(Continued)

(56) References Cited

U.S. PATENT DOCUMENTS 6,325,380 B1 12/2001 Feigl et al.
9,951,873 B2 * 4/2018 Inoue .................. F16J 15/3412
(Continued)

FOREIGN PATENT DOCUMENTS

JP S6231775 A 2/1987
JP S62117360 U 7/1987
(Continued)

OTHER PUBLICATIONS

International Search Report (ISR) dated Apr. 3, 2018, issued for International application No. PCT/JP2018/000787. (1 page).

*Primary Examiner* — Gilbert Y Lee
(74) *Attorney, Agent, or Firm* — Law Office of Katsuhiro Arai (57) ABSTRACT

In an exemplary embodiment, a sliding component includes a pair of sliding parts sliding relatively to each other. One sliding part is a stationary-side seal ring 7, and the other sliding part is a rotating-side seal ring 4, wherein the seal rings have sliding faces S formed radially for sealing a liquid or a misty fluid as a sealed fluid against leakage. At least one of the sliding faces S is provided with: spiral grooves 11 which have upstream ends 11*a* connected to a leakage side, and downstream ends 11*b* not connected to a circumferential edge on a sealed-fluid side, and are disposed at an angle from upstream to downstream; and discharge grooves 10 disposed at an angle such that their upstream ends 10*a* are located on the leakage side and their downstream ends 10*b* are located on the sealed-fluid side.

4 Claims, 4 Drawing Sheets (58) Field of Classification Search
CPC . F16J 15/3428; F16C 33/107; F16C 33/1065; F16C 33/74; F16C 2360/24
See application file for complete search history.

(56) References Cited

U.S. PATENT DOCUMENTS

| | | | |
|---|---|---|---|
| 2005/0212217 A1* | 9/2005 | Tejima | F16J 15/3412 |
| | | | 277/399 |
| 2015/0184752 A1 | 7/2015 | Itadani | |
| 2015/0260292 A1* | 9/2015 | Inoue | F16J 15/3412 |
| | | | 277/400 |
| 2018/0073394 A1* | 3/2018 | Tokunaga | F02C 7/06 |
| 2018/0128378 A1* | 5/2018 | Tokunaga | F16J 15/3412 |
| 2018/0172162 A1 | 6/2018 | Tokunaga et al. | |
| 2019/0285115 A1* | 9/2019 | Negishi | F16C 33/741 |
| 2019/0376558 A1* | 12/2019 | Kimura | F16C 17/045 |

FOREIGN PATENT DOCUMENTS

| | | |
|---|---|---|
| JP | 2001012610 A | 1/2001 |
| WO | 2014103631 A1 | 7/2014 |
| WO | 2016203878 A1 | 12/2016 |

\* cited by examiner

SLIDING COMPONENT

CROSS-REFERENCE TO RELATED APPLICATIONS

This application is the U.S. National Phase under 35 U.S.C. § 371 of International Application PCT/JP2018/000787, filed Jan. 15, 2018, which claims priority to Japanese Patent Application No. 2017-014827, filed Jan. 30, 2017. The International Application was published under PCT Article 21(2) in a language other than English.

TECHNICAL FIELD

The present invention relates to sliding components suitable, for example, for mechanical seals, bearings, and other sliding units. In particular, the present invention relates to sliding components such as seal rings that require reduction of friction by intervention of fluid between their sliding faces as well as prevention of leakage of fluid from the sliding faces, for example, oil seals used in gearboxes for turbochargers or for aircraft engines, or bearings.

BACKGROUND ART

Mechanical seals, which are an example of sliding components, are evaluated for their performance, based on their leakage rate, wear rate, and torque. Conventional arts have optimized the sliding materials and the sliding face roughness of mechanical seals, thereby enhancing performance and achieving low leakage, long life, and low torque. However, due to growing awareness of environmental problems in recent years, further improvements in the performance of mechanical seals have been required, and technical development beyond the limits of the conventional arts has been necessary.

Under such circumstances, as one used in an oil seal device of a rotating component such as a turbocharger, for example, a known one includes a rotating shaft rotatably accommodated in a housing, a disk-shaped rotating body that rotates with the rotating shaft, and a disk-shaped stationary body that is fixed to the housing and is brought into contact with an end face of the rotating body to prevent leakage of oil from the outer peripheral side to the inner peripheral side. An annular groove for generating positive pressure by the centrifugal force of fluid is provided on a contacting face of the stationary body to prevent leakage of oil from the outer peripheral side to the inner peripheral side (see Patent Document 1, for example).

A known one in a shaft seal device of a rotating shaft for sealing a toxic fluid, for example, includes a rotating ring together with the rotating shaft and a stationary ring mounted to a casing. A sliding face of one of the rotating ring and the stationary ring is provided with spiral grooves that draw in liquid on the low-pressure side toward the high-pressure side by the rotation of the rotating ring, with their ends on the high-pressure side being of a dead-end shape, to prevent a sealed fluid on the high-pressure side from leaking to the low-pressure side (see Patent Document 2, for example).

As a face seal structure suitable for sealing a drive shaft of a turbocharger against a compressor housing, for example, a known one includes a pair of seal rings working together, of which one is provided at a rotating component, and the other is provided at a stationary component. The seal rings have sealing faces formed substantially radially during operation, and a seal gap is formed between the sealing faces for sealing an outside area of the sealing faces against an inside area of the sealing faces. A plurality of circumferentially spaced recesses effective for supplying gas is provided on at least one of the sealing faces. The recesses extend from one circumferential edge toward the other circumferential edge of the sealing face, and the inner ends of the recesses are provided at a radial distance from the other circumferential edge of the sealing face. Thus, a non-gas component in a gas medium containing the non-gas component is sealed (see Patent Document 3, for example).

CITATION LIST

Patent Documents

Patent Document 1: JP S62-117360 U
Patent Document 2: JP S62-31775 A
Patent Document 3: JP 2001-12610 A

SUMMARY OF THE INVENTION

Problem to be Solved by the Invention

The conventional arts disclosed in Patent Documents 1 to 3, however, have a problem that grooves such as spiral grooves provided on one of sliding faces of a pair of sliding parts sliding relatively concentrate the flow of fluid into the inside of the sliding faces, and abrasion powder and dust accumulate inside the sliding faces, causing wear on the sliding faces and leakage.

It is an object of the present invention to provide a sliding component capable of preventing wear on sliding faces and occurrence of leakage, in which a surface texture is provided on a sliding face of at least one of a pair of sliding parts sliding relatively, to actively introduce fluid to the sliding faces from startup to and during normal operation to improve lubrication performance, and to prevent accumulation of foreign matter such as abrasion powder and contaminants inside the sliding faces.

Means for Solving Problem

To attain the above object, a sliding component according to a first aspect of the present invention includes a pair of sliding parts sliding relatively to each other, one of the sliding parts being a stationary-side seal ring, the other of the sliding parts being a rotating-side seal ring, the seal rings having sliding faces formed radially for sealing a liquid or a misty fluid as a sealed fluid against leakage. The sliding component is characterized in that at least one of the sliding faces is provided with spiral grooves having upstream ends connected to the leakage side and downstream ends not connected to a circumferential edge on the sealed-fluid side, and disposed at an angle from upstream to downstream, and discharge grooves disposed at an angle such that upstream ends are located on the leakage side and downstream ends are located on the sealed-fluid side.

According to this aspect, a fluid film between the sliding faces can be increased to improve the lubrication performance of the sliding faces, and foreign matter such as abrasion powder and contaminants present on the sliding faces can be discharged from the inside of the sliding faces to the sealed-fluid side, which can prevent wear on the sliding faces and occurrence of leakage.

According to a second aspect of the present invention, the sliding component in the first aspect is characterized in that the discharge grooves are of an outer peripheral discharge groove type with the upstream ends not connected to the leakage side and the downstream ends connected to the sealed-fluid side.

According to this aspect, the flow of fluid from the inside of the sliding faces can be formed to the outer peripheral side, ensuring the discharge of foreign matter from the inside of the sliding faces to the sealed-fluid side.

According to a third aspect of the present invention, the sliding component in the first aspect is characterized in that the discharge grooves are of an inner peripheral discharge groove type with the upstream ends connected to the leakage side and the downstream ends not connected to the sealed-fluid side.

According to this aspect, fluid on the leakage side can be actively pumped into the sliding faces S, the flow of the fluid from the inner periphery to the sliding faces S is accelerated, and foreign matter such as abrasion powder and contaminants present on the sliding faces S can be discharged to the outer peripheral side, using centrifugal force.

According to a fourth aspect of the present invention, the sliding component in the first aspect is characterized in that the discharge grooves are of the outer peripheral discharge groove type and of the inner peripheral discharge groove type.

According to this aspect, the discharge grooves of the inner peripheral discharge groove type can actively pump fluid on the leakage side into the sliding faces, accelerating the flow of the fluid from the inner periphery to the sliding faces, and the discharge grooves of the outer peripheral discharge groove type can form the flow of fluid from the inside of the sliding faces to the outer peripheral side, thus further ensuring that foreign matter can be discharged from the inside of the sliding faces to the sealed-fluid side.

According to a fifth aspect of the present invention, the sliding component in any one of the first to fourth aspects is characterized in that the discharge grooves have a groove depth deeper than the spiral grooves.

According to this aspect, the discharge of foreign matter such as abrasion powder and contaminants can be ensured, and negative pressure generation can be prevented to prevent the reduction of the floating force of the entire sliding face.

According to a sixth aspect of the present invention, the sliding component in any one of the first to fifth aspects is characterized in that the sliding face has a land provided with dimples.

According to this aspect, fluid can be stored on the entire sliding face, and positive pressure can be generated between the sliding faces to enhance the lubrication performance of the sliding faces.

Effect of the Invention

The present invention achieves the following outstanding effects:

(1) The pair of sliding parts sliding relatively to each other is provided. One of the sliding parts is the stationary-side seal ring, and the other of the sliding parts is the rotating-side seal ring. The seal rings have the sliding faces formed radially for sealing a liquid or a misty fluid as the sealed fluid against leakage. At least one of the sliding faces is provided with the spiral grooves having the upstream ends connected to the leakage side and the downstream ends not connected to the circumferential edge on the sealed-fluid side, and disposed at an angle from upstream to downstream, and the discharge grooves disposed at an angle such that the upstream ends are located on the leakage side and the downstream ends are located on the sealed-fluid side. Consequently, a fluid film between the sliding faces can be increased to improve the lubrication performance of the sliding faces, and foreign matter such as abrasion powder and contaminants present on the sliding faces can be discharged from the inside of the sliding faces to the sealed-fluid side, which can prevent wear on the sliding faces and occurrence of leakage.

(2) The discharge grooves are of the outer peripheral discharge groove type with the upstream ends not connected to the leakage side and the downstream ends connected to the sealed-fluid side. Consequently, the flow of fluid from the inside of the sliding faces can be formed to the outer peripheral side, ensuring the discharge of foreign matter from the inside of the sliding faces to the sealed-fluid side.

(3) The discharge grooves are of the inner peripheral discharge groove type with the upstream ends connected to the leakage side and the downstream ends not connected to the sealed-fluid side. Consequently, fluid on the leakage side can be actively pumped into the sliding faces, the flow of the fluid from the inner periphery to the sliding faces is accelerated, and foreign matter such as abrasion powder and contaminants present on the sliding faces S can be discharged to the outer peripheral side, using centrifugal force.

(4) The discharge grooves are of the outer peripheral discharge groove type and of the inner peripheral discharge groove type. Consequently, the discharge grooves of the inner peripheral discharge groove type can actively pump fluid on the leakage side into the sliding faces, accelerating the flow of the fluid from the inner periphery to the sliding faces, and the discharge grooves of the outer peripheral discharge groove type can form the flow of fluid from the inside of the sliding faces to the outer peripheral side, thus further ensuring that foreign matter can be discharged from the inside of the sliding faces to the sealed-fluid side.

(5) The discharge grooves have a groove depth deeper than the groove depth of the spiral grooves. Consequently, the discharge of foreign matter such as abrasion powder and contaminants can be ensured, and negative pressure generation can be prevented to prevent the reduction of the floating force of the entire sliding face.

(6) The sliding face has the land provided with the dimples. Consequently, fluid can be stored on the entire sliding face, and positive pressure can be generated between the sliding faces to enhance the lubrication performance of the sliding faces.

DESCRIPTION OF EMBODIMENTS

Hereinafter, with reference to the drawings, modes for carrying out this invention will be described illustratively based on embodiments. However, the dimensions, materials, shapes, relative arrangements, and others of components described in the embodiments are not intended to limit the scope of the present invention only to them unless otherwise described explicitly.

First Embodiment

Figure 1:
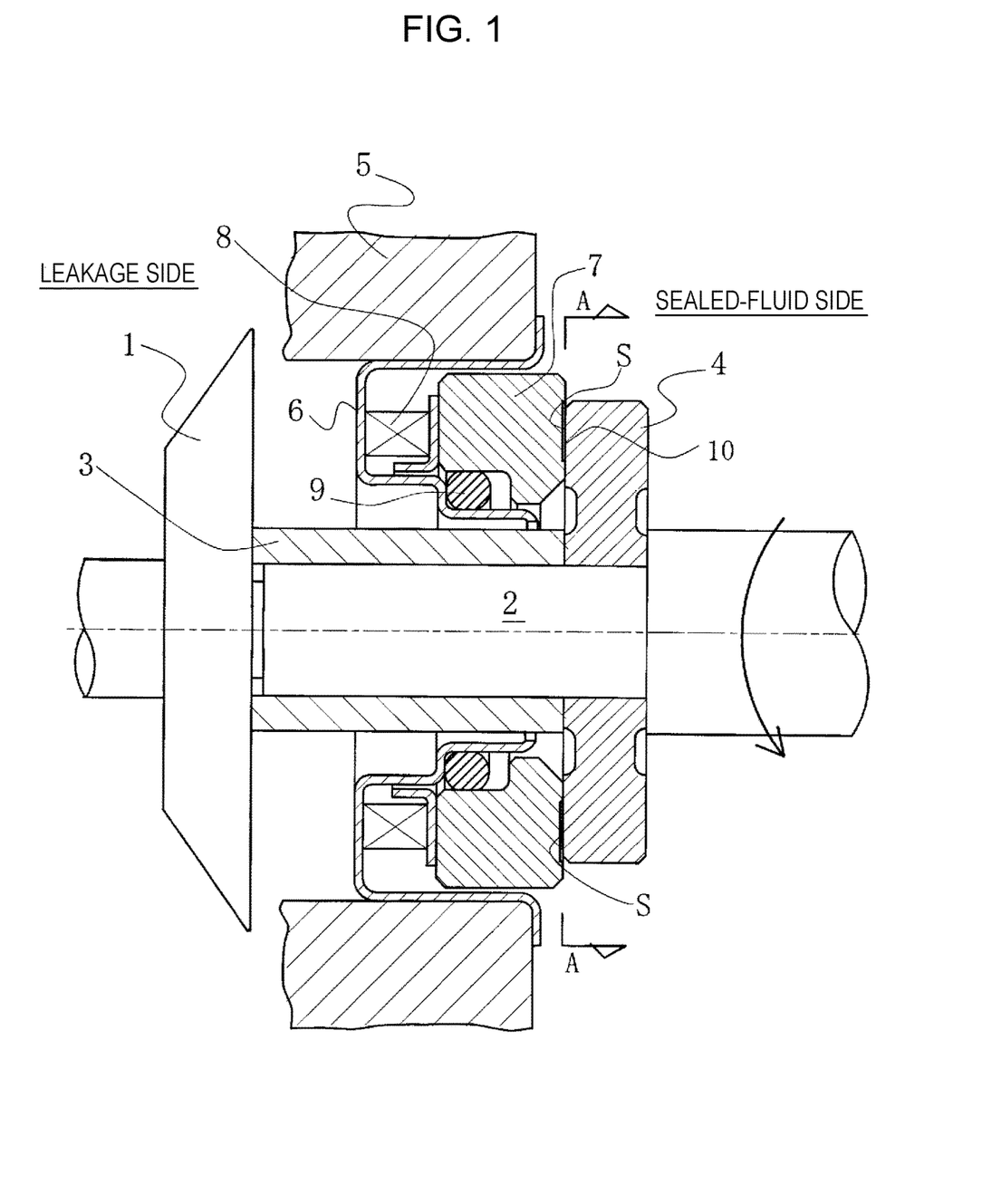
FIG. 1 is a vertical cross-sectional view showing an example of a mechanical seal according to a first embodiment of the present invention.
Figure 2:
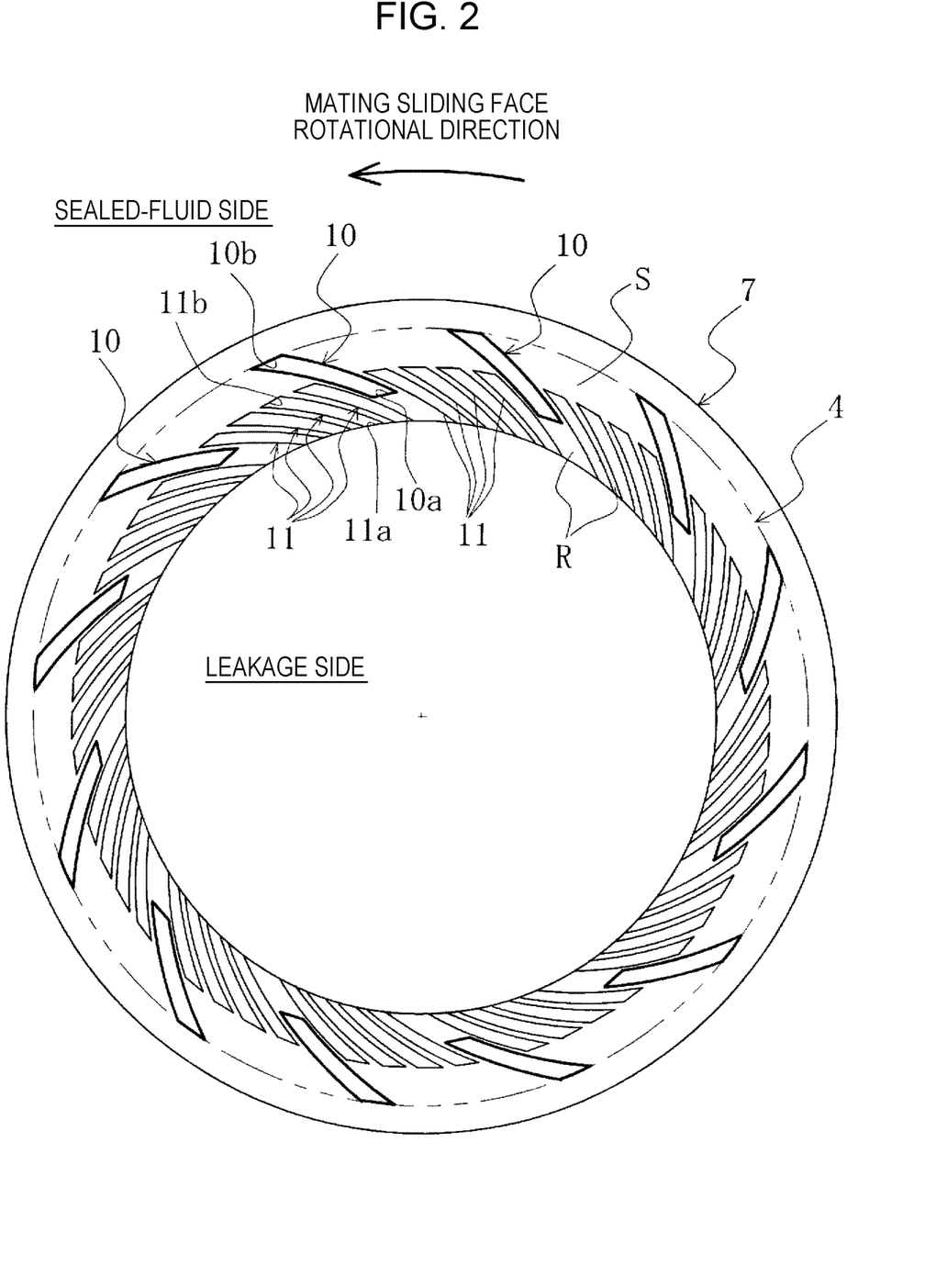
FIG. 2 shows a sliding face of a sliding part according to the first embodiment of the present invention, in which a surface texture (spiral grooves and discharge grooves) is provided on a sliding face of a stationary-side seal ring.

With reference to FIGS. 1 and 2, a sliding component according to a first embodiment of the present invention will be described.

Note that the embodiments below describe a mechanical seal, which is an example of a sliding component, as an example. The outer peripheral side of sliding parts constituting the mechanical seal is described as the sealed-fluid side (liquid side or misty-fluid side), and the inner peripheral side as the leakage side (gas side). However, the present invention is not limited to this, and is applicable to a case where the outer peripheral side is the leakage side (gas side), and the inner peripheral side is the sealed-fluid side (liquid side or misty-fluid side). As for the relationship in the magnitude of pressure between the sealed-fluid side (liquid side or misty-fluid side) and the leakage side (gas side), for example, the sealed-fluid side (liquid side or misty-fluid side) may be at high pressure, and the leakage side (gas side) at low pressure, or vice versa. Alternatively, both sides may be at equal pressure.

FIG. 1 is a vertical cross-sectional view showing an example of a mechanical seal, which is an inside mechanical seal in the form of sealing a sealed fluid tending to leak from the outer periphery toward the inner periphery of sliding faces, such as lubricating oil used at a bearing. The mechanical seal is provided with an annular rotating-side seal ring 4 that is one sliding part provided via a sleeve 3 at a rotating shaft 2 that drives an impeller 1 of a compressor provided in a turbocharger, in a state of being integrally rotatable with the rotating shaft 2, and an annular stationary-side seal ring 7 that is the other sliding part provided at a housing 5 via a cartridge 6 in a non-rotating state and in an axially movable state. With a coiled wave spring 8 axially urging the stationary-side seal ring 7, the rotating-side seal ring 4 and the stationary-side seal ring 7 slide in close contact with each other at sliding faces S.

That is, in this mechanical seal, the rotating-side seal ring 4 and the stationary-side seal ring 7 have the sliding faces S formed radially, and prevent a sealed fluid, for example, a liquid or a misty fluid (hereinafter, sometimes referred to simply as a "liquid") from flowing out from the outer periphery of the sliding faces S to the leakage side on the inner peripheral side at each other's sliding faces S.

Reference numeral 9 denotes an O-ring, which seals a space between the cartridge 6 and the stationary-side seal ring 7.

Although the present example describes a case where the sleeve 3 and the rotating-side seal ring 4 are separate, they are not limited to this. The sleeve 3 may be formed integrally with the rotating-side seal ring 4.

Also, the present example shows a case where the outer diameter of the stationary-side seal ring 7 is larger than the outer diameter of the rotating-side seal ring 4, but they are not limited to this, and may be the opposite.

The material of the rotating-side seal ring 4 and the stationary-side seal ring 7 is selected from silicon carbide (SiC) excellent in wear resistance, carbon excellent in self-lubricity, and the like. For example, both may be SiC, or a combination of one being SiC and the other being carbon is possible.

FIG. 2 shows a sliding face S of a sliding part according to the first embodiment of the present invention. The present example describes a case where the sliding face S of the stationary-side seal ring 7 in FIG. 1 is provided with discharge grooves 10 and spiral grooves 11 which constitute a surface texture.

In the present example, the outer diameter of the stationary-side seal ring 7 is set larger than the outer diameter of the rotating-side seal ring 4. Thus, the discharge grooves 10 and the spiral grooves 11 do not need to be provided to the outer peripheral edge of the sliding face S of the stationary-side seal ring 7, and only need to be provided to the outer peripheral edge of the rotating-side seal ring 4 shown by a broken line.

In the present example, since the sliding face S of the stationary-side seal ring 7 is processed to form the discharge grooves 10 and the spiral grooves 11, the stationary-side seal ring 7 is formed of carbon, and the rotating-side seal ring 4 is formed of silicon carbide (SiC).

In FIG. 2, the outer peripheral side of the sliding face S of the stationary-side seal ring 7 is the sealed-fluid side, e.g. the liquid side, and the inner peripheral side is the leakage side, e.g. the gas side. Assume that the mating sliding face rotates counterclockwise as shown by an arrow.

The sliding face S of the stationary-side seal ring 7 is provided with the spiral grooves 11 that have upstream ends 11a connected to the leakage side and downstream ends 11b not connected to the circumferential edge on the sealed-fluid side, and are disposed at an angle from upstream to downstream.

The spiral grooves 11 extend radially with a constant width, and are provided at an angle to facilitate the flow of fluid from the upstream ends 11a to the downstream ends 11b by relative sliding. The spiral grooves 11 are not limited to the spiral shape (helical shape), and include those with lines connecting opposite sides of the upstream ends 11a and opposite sides of the downstream ends 11b being linear, which are disposed at an angle like the spiral shape.

From startup to and during a high-speed rotating state of the rotating-side seal ring 4 such as normal operation, the spiral grooves 11 suck the gas from the upstream ends 11a, generating dynamic pressure (positive pressure) at or near the downstream ends 11b. Consequently, a slight gap is formed between the sliding faces S of the rotating-side seal ring 4 and the stationary-side seal ring 7, and the sliding faces S are brought into a gas lubrication state, having very low friction. At the same time, the gas on the inner peripheral side is pumped toward the outer peripheral side due to the spiral shape, and the liquid on the outer peripheral side can be prevented from leaking to the inner peripheral side. Further, since the spiral grooves 11 are separated from the outer peripheral side by a land R, leakage does not occur during rest.

It has been confirmed by the present inventors that when the spiral grooves 11 are arranged as described above, a high pressure value is exhibited at or near the downstream ends 11b of the spiral grooves 11, and flows concentrate into portions exhibiting the high pressure value, and foreign matter such as abrasion powder and dust also concentrate into the portions.

Therefore, the sliding face S is provided with the discharge grooves 10 disposed at an angle such that their upstream ends 10a are located on the leakage side and their downstream ends 10b are located on the sealed-fluid side.

The discharge grooves 10 extend radially with a constant width, are provided at an angle to facilitate the flow of fluid from the upstream ends 10a to the downstream ends 10b by relative sliding, and are of a spiral shape or a rectangular shape, for example.

The groove depth of the discharge grooves 10 is set sufficiently deeper than the groove depth of the spiral grooves 11, and is set to about 25 μm to 500 μm, for example. This ensures the discharge of foreign matter such as abrasion powder and contaminants, and prevents negative pressure generation so as not to reduce the floating force of the entire sliding face.

In the case of FIG. 2, the discharge grooves 10 are of an "outer peripheral discharge groove type" with the upstream ends 10a not connected to the leakage side and the downstream ends 10b connected to the sealed-fluid side.

The discharge grooves 10, the number of which is twelve, are circumferentially evenly spaced such that they are interposed between sets of four spiral grooves 11, with their upstream ends 10a extending toward the inner periphery to radially partially overlap outer-peripheral-side portions of the spiral grooves 11, and can accelerate flows from high-pressure portions into which the liquid on the outer peripheral side and the gas on the inner peripheral side concentrate, to the outer peripheral side.

The discharge grooves 10 cause foreign matter such as abrasion powder and contaminants present on the sliding faces S to be discharged from the inside of the sliding faces to the outside of the sliding faces to prevent wear on the sliding faces S.

The discharge grooves 10 of the outer peripheral discharge groove type shown in FIG. 2 have the function of accelerating the flow of fluid to the outer periphery to discharge foreign matter such as abrasion powder and contaminants present on the sliding faces S to the outer peripheral side, using centrifugal force.

Note that the land R (which means a smooth portion of the sliding face not processed to form grooves) of the sliding face S may be provided with a plurality of dimples not shown (grooves including circular grooves or the like) at an appropriate density. The dimples have the function of storing fluid inside, and the function of generating positive pressure between the sliding faces.

Now, the impeller 1 of the compressor is driven, and the rotating-side seal ring 4 is rotated via the rotating shaft 2. At the time of low-speed rotation, positive pressure is generated at or near the downstream ends 11b of the spiral grooves 11, separating the sliding faces slightly. The liquid on the outer peripheral side is introduced gradually into the sliding faces S, maintaining the sliding faces S in a noncontact state due to fluid lubricating action. Meanwhile, on the inner peripheral side, the gas is taken in slightly by the spiral grooves 11, preventing leakage to the inner peripheral side.

At the time of high-speed rotation, the liquid introduced into the sliding faces is blown away to the outer peripheral side by centrifugal force, so that fluid lubricating action by the liquid on the sliding faces is limited to the outer peripheral side. Meanwhile, the gas is sufficiently taken in on the inner peripheral side due to great dynamic pressure generated by the spiral grooves 11, maintaining the sliding faces in a noncontact state, and increasing pressure at the sliding faces, so that the liquid on the outer peripheral side does not leak to the inner peripheral side. The sliding faces are in a state of so-called gas seal.

Thus, at both the time of low-speed rotation and the time of high-speed rotation, the discharge grooves 10 of the outer peripheral discharge groove type can accelerate flows from the portions into which the liquid on the outer peripheral side and the gas on the inner peripheral side concentrate, to the outer peripheral side, discharging foreign matter such as abrasion powder and dust present on the sliding faces S from the inside of the sliding faces to the sealed-fluid side.

The configuration of the first embodiment described above achieves the following effects:

(1) The pair of sliding parts sliding relatively to each other is provided. One sliding part is the stationary-side seal ring 7, and the other sliding part is the rotating-side seal ring 4. The seal rings have the sliding faces formed radially for sealing a liquid or a misty fluid as the sealed fluid against leakage. At least one of the sliding faces S is provided with the spiral grooves 11 having the upstream ends 11a connected to the leakage side and the downstream ends 11b not connected to the circumferential edge on the sealed-fluid side, and disposed at an angle from upstream to downstream, and the discharge grooves disposed at an angle such that the upstream ends 10a are located on the leakage side and the downstream ends 10b are located on the sealed-fluid side. Consequently, a fluid film between the sliding faces S can be increased to improve the lubrication performance of the sliding faces S, and foreign matter such as abrasion powder and contaminants present on the sliding faces S can be discharged from the inside of the sliding faces to the sealed-fluid side, which can prevent wear on the sliding faces and occurrence of leakage.

(2) The discharge grooves 10 are of the outer peripheral discharge groove type with the upstream ends 10a not connected to the leakage side and the downstream ends 10b connected to the sealed-fluid side. Consequently, the flow of fluid from the inside of the sliding faces S can be formed to the outer peripheral side, ensuring the discharge of foreign matter from the inside of the sliding faces to the sealed-fluid side.

(3) The groove depth of the discharge grooves 10 is deeper than the groove depth of the spiral grooves 11. This can ensure the discharge of foreign matter such as abrasion powder and contaminants, and prevent negative pressure generation to prevent the reduction of the floating force of the entire sliding face.

(4) The land R of the sliding face can be provided with dimples, thereby storing fluid on the entire sliding face S and generating positive pressure between the sliding faces to enhance the lubrication performance of the sliding faces S.

Second Embodiment

Figure 3:
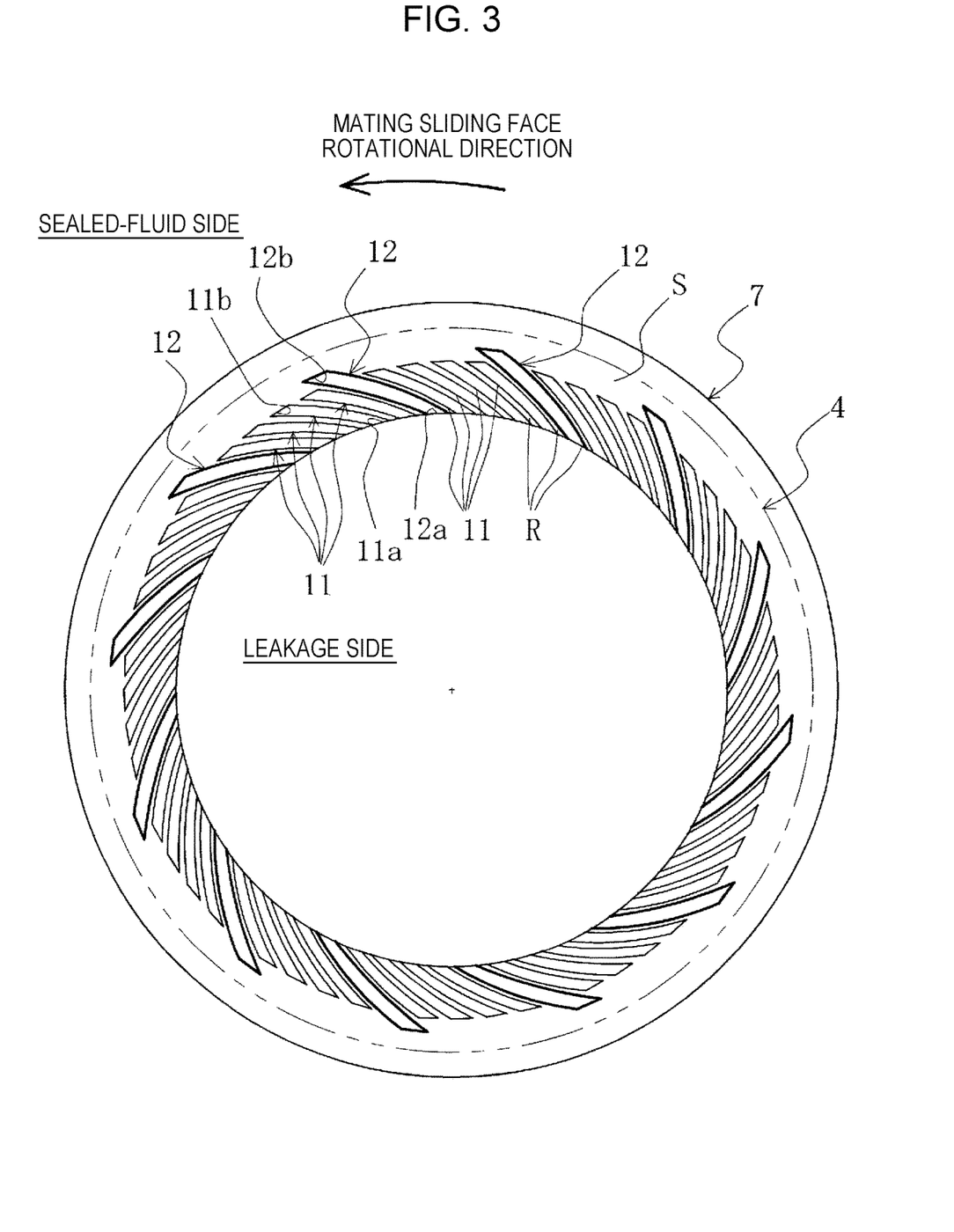
FIG. 3 shows a sliding face of a sliding part according to a second embodiment of the present invention, in which a surface texture (spiral grooves and discharge grooves) is provided on a sliding face of a stationary-side seal ring.

With reference to FIG. 3, a sliding part according to a second embodiment of the present invention will be described.

The sliding part according to the second embodiment is different from the sliding part of the first embodiment in that discharge grooves are inner peripheral discharge grooves. The other basic configuration thereof is identical to that of the first embodiment, and the same reference numeral is assigned to the same member as that in the first embodiment without duplicated explanation.

In FIG. 3, the sliding face S is provided with discharge grooves 12 disposed at an angle such that their upstream ends 12a are located on the leakage side and their downstream ends 12b are located on the sealed-fluid side.

The discharge grooves 12 extend radially with a constant width, are provided at an angle to facilitate the flow of fluid from the upstream ends 12a to the downstream ends 12b by relative sliding, and are of a spiral shape or a rectangular shape, for example.

The groove depth of the discharge grooves 12 is set deeper than the groove depth of the spiral grooves 11.

In the case of FIG. 3, the discharge grooves 12 are of an "inner peripheral discharge groove type" with the upstream ends 12a connected to the leakage side and the downstream ends 12b not connected to the sealed-fluid side.

The discharge grooves 12 are disposed circumferentially between the spiral grooves, and their downstream ends 12b extend farther toward the outer periphery than the spiral grooves 11.

The discharge grooves 12 of the inner peripheral discharge groove type shown in FIG. 3, whose upstream ends 12a are connected to the leakage side, can thus actively pump fluid on the leakage side into the sliding faces S, accelerating the flow of the fluid from the inner periphery to the sliding faces S, and can have the function of discharging foreign matter such as abrasion powder and contaminants present on the sliding faces S to the outer peripheral side, using centrifugal force.

Further, the discharge grooves 12 have the downstream ends 14b extending farther toward the outer periphery than the spiral grooves 11, and thus can accelerate flows from the high-pressure portions into which the liquid on the outer peripheral side and the gas on the inner peripheral side concentrate, to the outer peripheral side.

The configuration of the second embodiment described above achieves, in particular, the following effects:
(1) The discharge grooves 12, which are of the inner peripheral discharge groove type with the upstream ends 12a connected to the leakage side and the downstream ends 12b not connected to the sealed-fluid side, can thus actively pump fluid on the leakage side into the sliding faces S, accelerating the flow of the fluid from the inner periphery to the sliding faces S, and can discharge foreign matter such as abrasion powder and contaminants present on the sliding faces S to the outer peripheral side, using centrifugal force.
(2) The discharge grooves 12, whose downstream ends 12b extend farther toward the outer periphery than the spiral grooves 11, can thus accelerate flows from the high-pressure portions into which the liquid on the outer peripheral side and the gas on the inner peripheral side concentrate, to the outer peripheral side.

Third Embodiment

Figure 4:
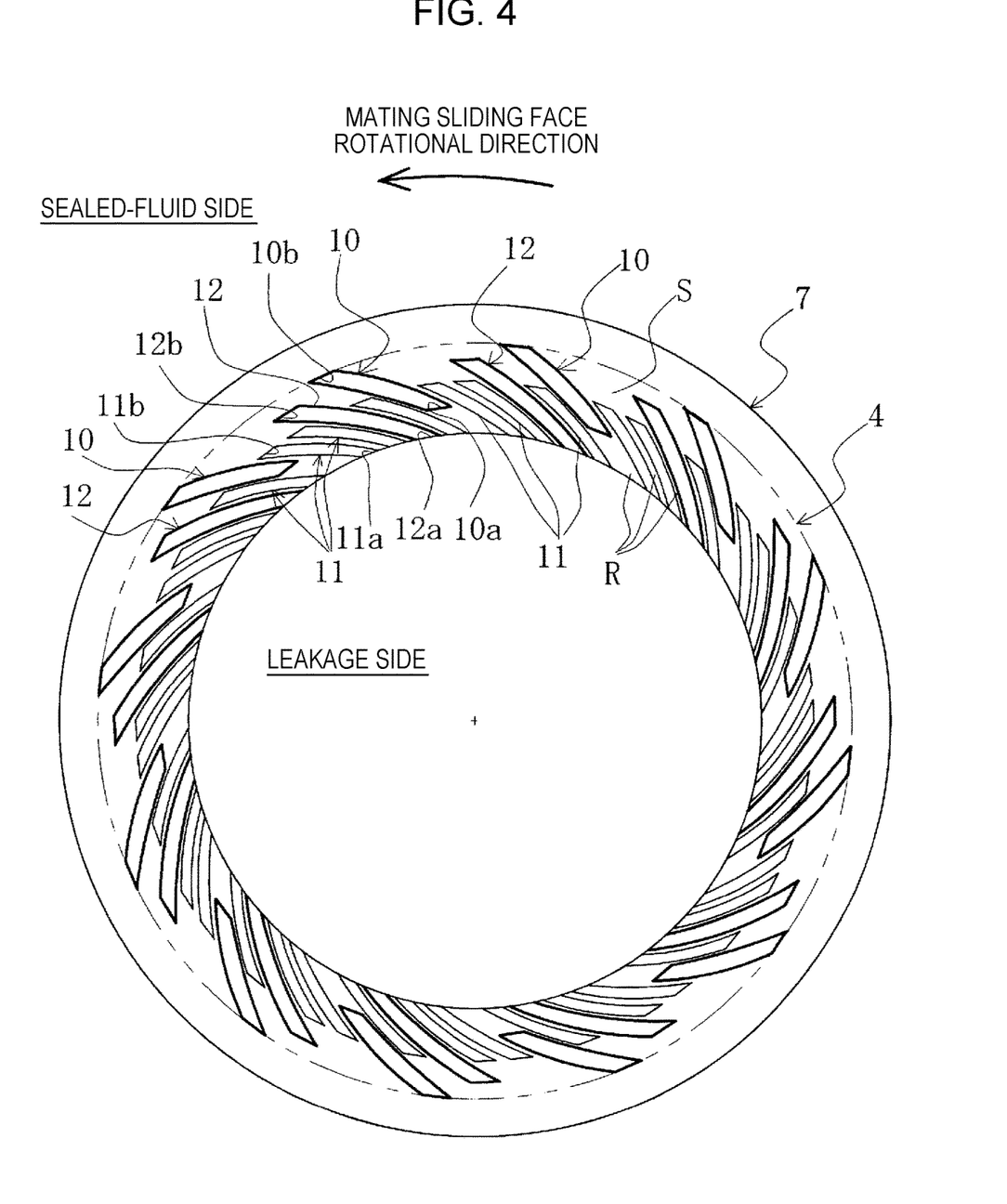
FIG. 4 shows a sliding face of a sliding part according to a third embodiment of the present invention, in which a surface texture (spiral grooves and discharge grooves) is provided on a sliding face of a stationary-side seal ring.

With reference to FIG. 4, a sliding part according to a third embodiment of the present invention will be described.

The sliding part according to the third embodiment is different from the sliding part of the first embodiment in that it includes as discharge grooves both those of the outer peripheral discharge groove type and those of the inner peripheral discharge groove type. The other basic configuration thereof is identical to that of the first embodiment, and the same reference numeral is assigned to the same member as that in the first embodiment without duplicated explanation.

In FIG. 4, the sliding face S is provided with both discharge grooves 10 of the outer peripheral discharge groove type and discharge grooves 12 of the inner peripheral discharge groove type.

In the case of FIG. 4, the discharge grooves 10 of the outer peripheral discharge groove type and the discharge grooves 12 of the inner peripheral discharge groove type, the numbers of which are each twelve, are evenly spaced in such a manner that one of the spiral grooves 11 is interposed between a corresponding one of the discharge grooves 10 of the outer peripheral discharge groove type located upstream and a corresponding one of the discharge grooves 12 of the inner peripheral discharge groove type located downstream, and two of the spiral grooves 11 are interposed between the corresponding one of the discharge grooves 12 of the inner peripheral discharge groove type and a corresponding one of the discharge grooves 10 of the outer peripheral discharge groove type located downstream thereof, but are not limited to this.

For example, two of the spiral grooves 11 may be interposed between a corresponding one of the discharge grooves 10 of the outer peripheral discharge groove type located upstream and a corresponding one of the discharge grooves 12 of the inner peripheral discharge groove type located downstream, and one of the spiral grooves 11 may be interposed between the corresponding one of the discharge groove 12s of the inner peripheral discharge groove type and a corresponding one of the discharge grooves 10 of the outer peripheral discharge groove type located downstream thereof. The numbers of the evenly spaced discharge grooves may each be twelve or more or less. It is essential only that the discharge grooves are circumferentially arranged in an appropriately distributed manner.

According to the configuration of the third embodiment described above, in particular, the discharge grooves 12 of the inner peripheral discharge groove type can actively pump fluid on the leakage side into the sliding faces S, accelerating the flow of the fluid from the inner periphery to the sliding faces S, and the discharge grooves 10 of the outer peripheral discharge groove type can form the flow of fluid from the inside of the sliding faces S to the outer peripheral side, thus further ensuring that foreign matter can be discharged from the inside of the sliding faces to the sealed-fluid side.

The embodiments of the present invention have been described above with reference to the drawings, its specific configuration is not limited to the embodiments, and any changes and additions made without departing from the scope of the present invention are included in the present invention.

For example, although the above embodiments have described the example where the sliding part is used as one of a pair of a rotating seal ring and a stationary seal ring in a mechanical seal device, the sliding part can also be used as a bearing sliding part that slides on a rotating shaft while sealing lubricating oil on one axial side of its cylindrical sliding face.

Further, for example, although the above embodiments have described the outer peripheral side of the sliding parts as the sealed-fluid side (liquid side or misty-fluid side), and the inner peripheral side as the leakage side (gas side), the present invention is not limited to this, and is also applicable to a case where the outer peripheral side is the leakage side (gas side), and the inner peripheral side is the sealed-fluid side (liquid side or misty-fluid side). As for the relationship in the magnitude of pressure between the sealed-fluid side (liquid side or misty-fluid side) and the leakage side (gas side), for example, the sealed-fluid side (liquid side or misty-fluid side) may be at high pressure, and the leakage side (gas side) at low pressure, or vice versa. Alternatively, both sides may be at equal pressure.

Further, for example, the above embodiments have described the case where the shapes of the discharge grooves 10 and 12 and the spiral grooves 11 are spiral shapes (helical shapes), but the present invention is not limited thereto. For example, they may be of a shape with lines connecting opposite sides of the upstream ends and opposite sides of the downstream ends being linear, which are disposed at an angle like the spiral shape.

REFERENCE SIGNS LIST 1 impeller
2 rotating shaft
3 sleeve
4 rotating-side seal ring
5 housing
6 cartridge
7 rotating-side seal ring
8 coiled wave spring
10 discharge groove (outer peripheral discharge groove type)
10a upstream end
10b downstream end
11 spiral groove
11a upstream end
11b downstream end
12 discharge groove (inner peripheral discharge groove type)
12a upstream end
12b downstream end
S sliding face
R land

The invention claimed is:

1. A sliding component comprising a pair of sliding parts sliding relatively to each other, one of the sliding parts being a stationary-side seal ring, the other of the sliding parts being a rotating-side seal ring, the sliding parts having sliding faces formed radially for sealing a liquid or a misty fluid as a sealed fluid against leakage from a sealed-fluid side faced by one circumferential edge of each sliding face, to a leakage side faced by another circumferential edge of each sliding face, wherein:

at least one of the sliding faces is provided with:

spiral grooves having upstream ends communicating with the leakage side and downstream ends not communicating with the sealed-fluid side, and disposed at an angle from upstream to downstream, and discharge grooves disposed at an angle such that upstream ends are located on the leakage side and downstream ends are located on the sealed-fluid side, wherein the discharge grooves are comprised of:

outer discharge grooves of an outer peripheral discharge groove type wherein the upstream ends do not communicate with the leakage side, and the downstream ends communicate with the sealed-fluid side; and inner discharge grooves of an inner peripheral discharge groove type wherein the upstream ends communicate with the leakage side, and the downstream ends do not communicate with the sealed-fluid side, wherein the upstream ends of the outer discharge grooves extend toward the leakage side in a manner partially overlapping the spiral grooves as viewed in the circumferential direction, and the downstream ends of the inner discharge grooves extend toward the sealed-fluid side beyond the downstream ends of the spiral grooves.

2. The sliding component according to claim 1, characterized in that the discharge grooves have a groove depth deeper than the spiral grooves.

3. The sliding component according to claim 1, characterized in that the sliding face has a land provided with dimples.

4. The sliding component according to claim 2, characterized in that the sliding face has a land provided with dimples.

* * * * *